July 7, 1953            G. G. HAVENS            2,644,777

COMPOSITE STRUCTURAL MATERIAL

Filed April 5, 1950                          2 Sheets—Sheet 1

INVENTOR
GLENN G. HAVENS
BY
ATTORNEY

July 7, 1953  G. G. HAVENS  2,644,777
COMPOSITE STRUCTURAL MATERIAL
Filed April 5, 1950  2 Sheets-Sheet 2
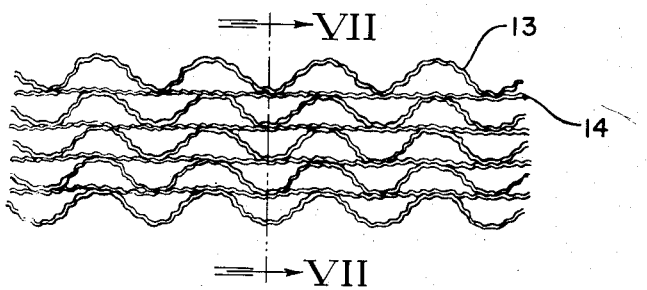
*Fig. 6*
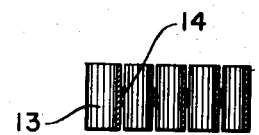
*Fig. 7*
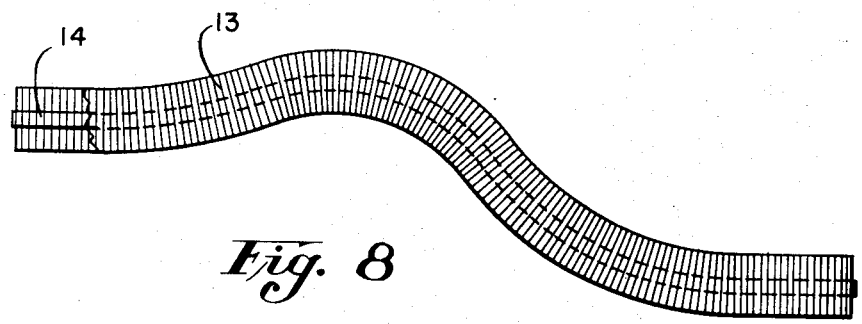
*Fig. 8*
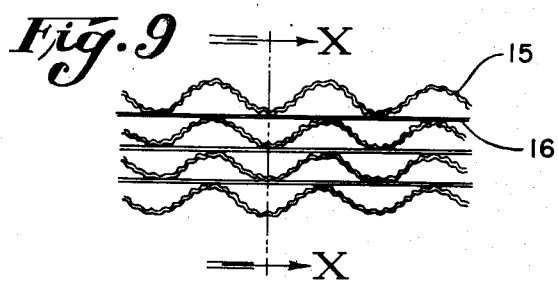
*Fig. 9*
*Fig. 10*
*Fig. 11*
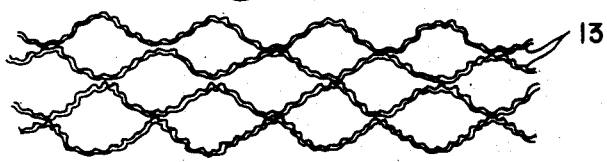
INVENTOR.
GLENN G. HAVENS
BY
ATTORNEY.

Patented July 7, 1953

2,644,777

UNITED STATES PATENT OFFICE 2,644,777

COMPOSITE STRUCTURAL MATERIAL

Glenn George Havens, San Diego, Calif., assignor to Narmco, Inc., San Diego, Calif., a corporation of California Application April 5, 1950, Serial No. 154,138

3 Claims. (Cl. 154—45.9)

This invention relates to a composite structure and, in particular, it relates to a structural member having spaced surfaces and vertically disposed ribbons interposed between and attached to the spaced surfaces. Still further, the invention relates to a core material constituting a spacing and reinforcing member adapted to serve as the body portion of a structural element.

The present invention is intended to supply a new light weight material adaptable for structural purposes. In many cases, it is desirable to form a structure which is both light in weight and sufficiently stiff and rigid to function as a strain resisting member. Examples of the use for such a material are panels, bulkheads, flooring, aircraft blisters or protuberances, or radomes, or the like.

In general, my invention comprises a pair of light weight sheets of material held in spaced relationship by a plurality of ribbons of thin material disposed at right angles to the spaced sheets and interposed therebetween; each of the ribbons being in wave formation and being again divided into smaller waves which follow the path of the principal wave; and, the edges of the ribbon being attached to the spaced sheets so as to form a unitary composite structure. The ribbon material, because of its multiple wave formation may be readily bent or shaped to conform with various curved surfaces of spaced sheets. An example of such a curved material is a portion of a spherical member. Another example is an elongated curved member utilizing compound curves such as in radomes for aircraft.

Also, my invention comprises the core material itself, separate from the spaced sheets. In this case, adjacent rows of ribbons in wave formation are secured together by an intermediate strip forming a stabilizer or retainer.

Among the objects and advantages of my invention are to provide a structural material having a high degree of strength and stiffness in combination with lightness in weight; to provide such a composite structure which may be formed of metallic or non-metallic material, or combinations thereof; to provide such a structural material which possesses temperature insulating characteristics due to air spaces interposed between the spaced sheets; to provide such a structural material which may be formed of non-metallic members, thus reducing interferences in the transmission or reception of electrical waves therethrough; to provide such a structural material which possesses channels or ducts extending therethrough as part of its structure, thus enabling the passage of heated or cooled air therethrough for temperature control purposes; and, to provide a structure of the class described which may be manufactured efficiently and economically.

These and other objects and advantages will appear more fully in the following detailed description when considered in connection with the accompanying drawing, in which:

Figure 6 is a plan view of a portion of a core material formed of connected spacer ribbons;

Figure 7 is a sectional view thereof, taken along lines VII—VII of Figure 6;

Figure 8 is a side elevational view of the core material illustrating its flexibility;

Figure 9 is a plan view of a portion of a modified core material formed of spacer ribbons and rigid interconnecting retainer; and, Figure 10 is a sectional view thereof, taken along lines X—X of Figure 9.

Figure 11 is a plan view of the core material of a modified form of my invention.

Figure 1:
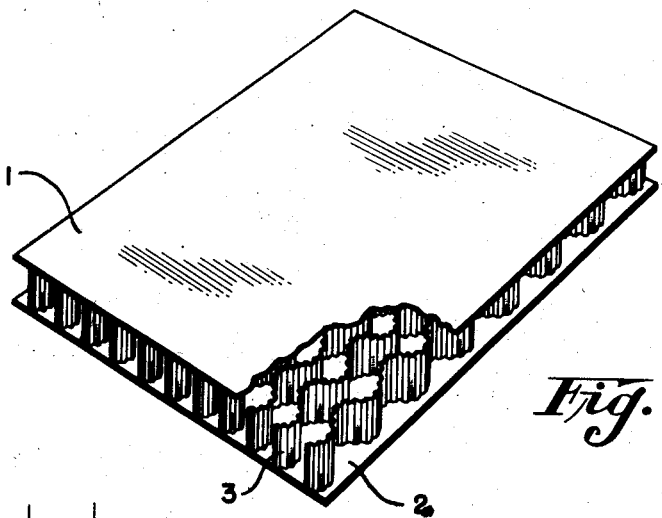
Figure 1 is a perspective view, partly broken away, illustrating a structural member forming an embodiment of my invention.

With reference to the drawing and, in particular, to Figure 1, I show a structural member forming an embodiment of my invention comprising, essentially, a pair of spaced walls 1 and 2, and a plurality of ribbons 3 in wave formation interposed between the walls 1 and 2, and at right angles to the surface of the walls. The walls 1 and 2 may be formed of any strong sheet material either metallic or non-metallic. Preferably, the walls 1 and 2 are formed of sheet aluminum or of non-metallic material such as fibre, conventional plastic sheet material, or resin strengthened fabric. The thickness of the walls will, of course, depend upon the total thickness of the composite structure.

Figure 2:
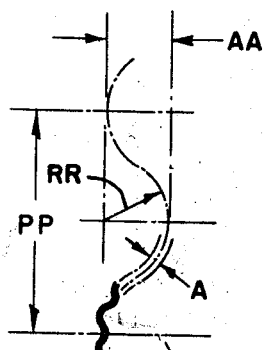
Figure 2 is an enlarged plan view of a portion of a spacer ribbon.

An enlarged plan view of the ribbon 3 is shown, in particular, in Figure 2. An essential requirement of the ribbon 3 is that it provides both longitudinal and transverse stability.

In order to accomplish this, the ribbon is shaped to assume a wave pattern. This wave pattern comprises, essentially, a uniform wave defined by a radius meeting with and tangent to a similar but reverse radius. In addition to this wave pattern, the wave contour is itself divided into smaller waves. For purpose of distinction the larger wave is hereinafter referred to as a corrugation and the smaller wave is referred to as a crinkle.

Beginning with the smaller wave or crinkle, and as shown in Figure 2, the reference character R designates the radius of the crinkle. I have found that the proper proportion for the radius R is from 5 to 20 times the thickness of the ribbon 3. Similarly, the proportion of the corrugation radius RR is from 5 to 20 times the radius of the crinkle. For example, if the thickness of the ribbon 3 is .002 inch and using a factor of ten, the radius of the crinkle should be .020 inch, and the radius of the corrugation should be .200 inch.

The amplitude of the crinkle or corrugation is relative to the radius of the crinkle or corrugation. By amplitude I refer to the one-half total wave height, or one-half the distance from valley to crest or peak. The amplitude of the crinkle is equal to from .25 to 2 times the radius of the crinkle. Similarly, the amplitude of the corrugation is equal to from .25 to 2 times the radius of the corrugation. As shown in the drawing, Figure 2, the reference character BB represents the amplitude of the crinkle, and the reference character B represents the amplitude of the corrugations.

It is to be understood that it is not necessary for the radius R and RR to be a true radius. For example, this curve may take the form of a parabola, hyperbola, or ellipse. For this reason it is also desirable to define the relative proportions of the sine or undulating wave in the form of amplitude and pitch or wave length. In such case, the crinkle amplitude BB is equal to from 5 to 40 times the thickness of the ribbon, and the corrugation amplitude B is equal to from 5 to 20 times the crinkle amplitude. In this case the pitch or wave length should also be taken into consideration. The pitch of the crinkle is designated in Figure 2 by the character AA, and the pitch of the corrugations by A. Preferably, the pitch of the crinkle is equal to from 20 to 80 times the thickness of the ribbon, and the pitch of the corrugations is equal to from 5 to 20 times the pitch of the crinkle.

Figure 3:
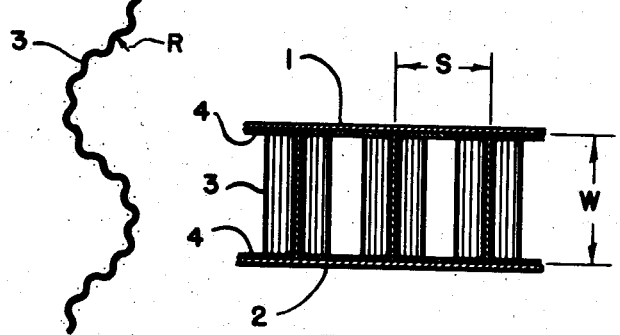
Figure 3 is a transverse view, in section, of a portion of the structural member, as shown in Figure 1.

By this peculiar contour of the ribbon 3, it is possible to form a vertical member or core material which functions effectively as a spacer between the walls 1 and 2. Figure 3 illustrates the proportions in spacing a plurality of ribbons in parallel formation and in adhering the ribbons with the wall members 1 and 2.

The spacing of the ribbons is indicated by the reference character S, Figure 3. The ribbons may be spaced apart a distance less than the in phase amplitude of the wave. In such case the in phase ribbons "nest" together in spaced relation with the peaks of the waves in one ribbon in adjacent spaced relation with the peaks of the waves in the adjacent ribbon. It is also to be understood that the phase of the adjacent ribbons may be displaced so that the alternate peaks thereof contact each other. Best results are obtained by spacing the ribbons apart a distance from .75 to 2.0 times the corrugation amplitude.

For high strengths it is desirable to keep the maximum thickness of the sandwich or width of the ribbon W (Fig. 3) to less than 8000 times the thickness of the ribbon. There is no lower limit of the ribbon width. However, for practical purposes there is no advantage in making a ribbon having a width of less than 50 times the thickness of the ribbon. Thus, a ribbon having a thickness of .002 inch may have a width of from .100 inch to 16.0 inches.

The thickness of the sandwich is shown to be uniform; that is, the plates 1 are positioned in spaced parallel relation. However, the plates need not be parallel because in certain cases it may be desired to position the plates in a tapered assembly, or in an assembly including straight or curved surfaces.

The next step in the formation of the composite structural member is the application of an adhesive 4 in such a manner as to secure the ribbons 3 in tight engagement with the wall members 1 and 2. For this purpose I have found that a preferred adhesive is one in the form of a thermosetting synthetic resin.

Specific examples of suitable resins are phenol formaldehyde or polymerized phenol formaldehyde. To this may be added a modifier for reducing brittleness in the form of an alcohol soluble polyamid (nylon) or neoprene. Good results can be obtained by utilizing the proportions of 100 parts of the phenol formaldehyde to 33½ parts of polyamide.

Other bonding mediums include resinous compounds whose polymerizing group is an allyl group, styrene copolymers, di-allyl phthalate, bi-methacrylate, acrylic base resins, and others. Low pressure phenolic resins, urea formaldehyde, thiourea, melamine formaldehyde, and aniline formaldehyde may also also be used as well as high pressure resins of the phenolic, urea and other types, but the low pressure resins are preferred.

Low pressure thermosetting plastics as referred to herein may also include materials by adding together or combining one or more low pressure thermosetting resins and one or more thermoplastics. Material of this type possesses the characteristics of thermosetting plastics and reduces any tendency toward brittleness inherent therein.

In order to apply the adhesive, the ribbons 3 may be held in fixed position by a jig or fixture, and the lower wall, such as 2, is coated with the adhesive 4 in liquid form whereupon the ribbons 3 still retained by the fixture is laid upon and held against the surface of the wall 2 and in contact with the adhesive. While in this state the adhesive is dried by the application of heat, resulting in a hard deposit which forms a strong bond with the wall 2 and with the ribbons 3. This bond is of sufficient strength that it is substantially equal to the strength of the material constituting the ribbon itself. After the ribbons are bonded to the wall 3, as thus described, the fixture for holding the ribbons 3 is removed, the assembly is inverted, and the ribbons are forced into contact with the wall 1 which also has been coated with a layer of liquid adhesive 4. A similar drying operation takes place to complete the assembled structure.

When thermo-setting or thermoplastic resins are used, such resins may be dried on the plates 1 and 2 before the application of the ribbons, the subsequent heating operation being sufficient to soften the resin to effect the bonding condition.

Figure 4:
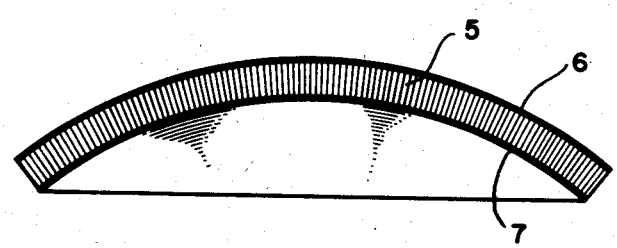
Figure 4 is a side elevational view illustrating the embodiment of my invention in the form of a spherical or double curved member.

In Figure 4, I show a modification of my invention in which a ribbon 5 is interposed and bonded to opposing walls 6 and 7. The walls 6 and 7 are shown in a shape which is spherical as distinguished from the flat walled structure shown in Figure 1. It is to be understood that the walls 6 and 7 may be irregular in shape and may include compound curves. The ribbon 5 which, in its original position, is similar to the ribbon 3 is readily flexible because of its multi-wave structure and, therefore, it will readily assume and follow any curved surface within reasonable limitations. The method of assembling the ribbons and of bonding the ribbons to the walls 6 and 7 is substantially similar to the method as described in connection with the structure as shown in Figure 3. The curved assembly, as shown in Figure 4 is useful in the formation of structural portions of aircraft, and also in the formation of blisters or radomes as used in aircraft.

Figure 5:
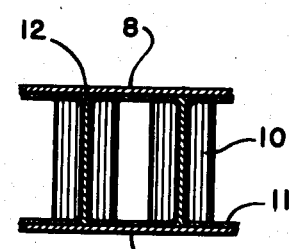
Figure 5 is a transverse view similar to Figure 3, except that it illustrates a modified form of my invention.

A further modification of my invention is shown in Figure 5 which illustrates a pair of spaced walls 8 and 9 in which vertically disposed ribbons 10 are interposed therebetween and bonded to the walls by an adhesive 11. These members are essentially the same as that described in Figure 3, except that the edges of the ribbons 10 which engage with the walls 8 and 9 are swaged so as to form enlarged marginal edges 12. These enlarged edges or feet serve to increase the area of the ribbons adjacent to the adhesive so as to provide a greater bonding surface. As a result of this formation of the ribbon 10, greater structural stability is attained and a stronger bond is effected between the adjoining parts.

The following illustrates a few examples of a light weight structure according to the practice of my invention:

*Example I*

A composite material as shown in Figure 1, comprising a pair of spaced sheets of 0.016 inch magnesium, a double wave ribbon of .002 inch 3 SO aluminum foil having a width of .800 inch, a corrugation radius of .200 inch and a crinkle radius of .020 inch, a corrugation amplitude of 0.250 inch, and a ribbon spacing of 0.250 inch. Total weight including adhesive, 0.60 lb. per square foot.

*Example II*

A composite material as shown in Fig. 1, comprising a pair of spaced sheets of .016 inch synthetic resin impregnated glass fabric, a double wave ribbon of .001 inch 24SF aluminum foil having a width of .200 inch, a corrugation radius of .100 inch and a crinkle radius of .010 inch, a corrugation amplitude of .100 inch, and a ribbon spacing of .100 inch.

*Example III*

A composite material as shown in Fig. 1, comprising a pair of spaced sheets of .032 inch 24ST aluminum, a double wave ribbon of .005 inch 3SO aluminum foil having a width of 10.00 inches, a corrugation radius of 2.000 inches and a crinkle radius of .100 inch, a corrugation amplitude of 4.000 inch, and a ribbon spacing of 3.00 inch.

*Example IV*

A composite core material as shown in Fig. 6, comprising a plurality of double wave ribbons of .004 inch resin strengthened fabric having a width of .500 inch, a crinkle amplitude of .040 inch, a corrugation amplitude of .300 inch, a ribbon spacing of .275 inch, and a retainer of the same material and same crinkle, having a width of .100 inch bonded with adjacent ribbons to form a composite core.

Figures 6, 7, and 8 illustrate a modification of my invention in which the double wave ribbon material is held together by a stabilizer or retainer so as to form a core material which, in itself, constitutes an interconnected composite structure. In Fig. 6, the double wave ribbon material 13 is formed in accordance with the general proportions as that described in connection with the ribbon material 3. As shown in Fig. 6, a plurality of ribbons 13 are assembled together in spaced formation with a stabilizer or retainer 14 interposed between adjacent ribbons 13. The retainer 14 is preferably made of the same material composition as the ribbon 13 and of the same thickness. The retainer also includes a crinkle formation corresponding with the crinkle of the ribbon 13. However, it does not include the larger corrugations. Preferably, the width of the retainer 14 is approximately $\frac{1}{16}$ inch. However, this may be made wider if it is desired to make the assembly stiffer, as shown, for example, in the uncrinkled retainer of Figure 10 to be hereinafter described. The row of ribbons 13 are spaced sufficiently close so that the retainer 14 engages the peaks of the adjacent ribbons. In the assembly of the ribbons and retainers, the retainers are previously coated with an adhesive with the result that upon drying of the adhesive the ribbons 13 and retainers 14 become bonded together to form a unit structure.

Adjacent ribbons are assembled in spaced relation with the peaks of the waves in one ribbon in adjacent spaced relation with the valleys of the waves in the adjacent ribbon. The ribbons may also be assembled with the peaks of the waves in one ribbon in contact and adhered relation with the peaks of the waves of the adjacent ribbon, as shown in Figure 11. In such case no retainer is necessary, although it can be employed if increased rigidity and strength is desired. It is to be understood herein that where reference is made to the peaks of adjacent ribbons being in contact with each other, that it is contemplated that a retainer may be disposed therebetween.

Figure 7 illustrates a section through the assembly illustrated in Fig. 6, and shows that the retainers 14 are positioned midway between the widths of the ribbons 13. The retainers 14 are in crinkle formation so that they will be more flexible and thus allow the entire assembly to assume various shapes and contours.

Figure 8 illustrates a side elevational view of a portion of a core forming a composite unit made up of the ribbons 13 and retainers 14. As illustrated, this core material is readily flexible and easily assumes various shapes either longitudinally or transversely, or combinations thereof.

While reference is made to the retainer 14 as a metallic member in crinkle formation, it is to be understood that other flexible material may function with equal effectiveness. For example, the retainer may be formed of textile material, such as threads or filaments of cotton, nylon, glass, or the like., Still further, the retainer may be formed of paperlike material in flat strip formation, or twisted such as a cord.

Figures 9 and 10 show a further modification of the invention illustrating ribbons 15 and retainers 16. In this case the ribbons 15 are identical to that described in connection with the ribbons 13. Also, the spacing of the ribbons is the same as that described in connection with Figure 6. However, the retainer 16 is shown extending the full length of the ribbon 15 and, also, it does not include the crinkles present in the ribbons 15. The purpose of this retainer is to add additional stiffness to the ribbons to form a composite unit which in itself is substantially rigid. The retainer 16 may be formed of metal foil, paper, glass fabric, or other material having similar characteristics, the principal requirement of which is to merely function to hold the ribbons together and to serve as a stiffening medium. It is to be understood that the core material, as shown in Figures 6 to 10, is intended to form a unit structure which may be easily handled and cut to any desired size for its use between spaced plates to which it becomes subsequently attached.

As thus described, it is believed apparent that I have provided a novel combination resulting in a composite structure having the greatest possible strength in combination with lightness in weight, and in combination with an arrangement of parts which lends itself to practical and economical methods of fabrication.

While I have shown preferred embodiments of my invention, it is to be understood that it is susceptible of those modifications which appear obviously within the spirit of my invention and as appearing in the scope of the appended claims.

Having thus described my invention, what I claim and desire to protect by Letters Patent is:

1. A structural score member consisting of a plurality of ribbons in spaced relation, said ribbons forming an undulating wave pattern extending across said member in generally parallel relation with a secondary and substantially uniform undulating wave pattern of smaller pitch and amplitude following the contour of the principal wave pattern and extending the full length of said ribbons, a retaining strip of less width than said ribbons between adjacent spaced ribbons, and an adhesive forming a bond between the retaining strips and the peaks of the waves of the ribbons.

2. A structural core member consisting of a plurality of ribbons in spaced relation to bear loading on the ribbon edges, said ribbons forming an undulating wave pattern extending across said member in generally parallel relation and having a secondary and substantially uniform undulating wave pattern of smaller pitch and amplitude following the contour of the first mentioned wave pattern and extending the full length of said ribbons, a retaining strip interposed between each of the said ribbons, said strip having an undulating wave pattern similar in pitch and amplitude to the second mentioned undulating wave pattern of the ribbons and an adhesive forming a bond between the retaining strips and the peaks of the waves in adjacent ribbons.

3. A structural core member consisting of a plurality of ribbons in spaced relation to bear loading on the ribbon edges, said ribbons forming an undulating wave pattern extending across said member in generally parallel relation and having a secondary and substantially uniform undulating wave pattern of smaller pitch and amplitude following the contour of the first mentioned wave pattern and extending the full length of said ribbons, a retaining strip of less width than said ribbons positioned between adjacent ribbons, said strip having an undulating wave pattern similar in pitch and amplitude to the second mentioned undulating wave pattern of the ribbons and an adhesive forming a bond between the retaining strips and the peaks of the waves in adjacent ribbons.

GLENN GEORGE HAVENS.

References Cited in the file of this patent

UNITED STATES PATENTS

| Number | Name | Date |
| --- | --- | --- |
| 1,754,784 | Borsodi | Apr. 15, 1930 |
| 1,925,453 | Mazer | Sept. 5, 1933 |
| 2,001,632 | Schlichting | May 14, 1935 |
| 2,045,733 | Spafford | June 30, 1936 |
| 2,108,795 | Budd | Feb. 22, 1938 |
| 2,196,470 | Montgomery et al. | Apr. 9, 1940 |
| 2,221,006 | Romanoff | Nov. 12, 1940 |
| 2,477,852 | Bacon | Aug. 2, 1949 |
| 2,583,443 | Perry et al. | Jan. 22, 1952 |

FOREIGN PATENTS

| Number | Country | Date |
| --- | --- | --- |
| 36,669 | Norway | Jan. 29, 1923 |
| 36,838 | Norway | Feb. 19, 1923 |
| 865,382 | France | May 21, 1941 |